US012558634B1

(12) United States Patent
Maddox

(10) Patent No.: US 12,558,634 B1
(45) Date of Patent: Feb. 24, 2026

(54) PET MEMORIAL DEVICE

(71) Applicant: Sheryl Maddox, Lakewood, CA (US)

(72) Inventor: Sheryl Maddox, Lakewood, CA (US)

( * ) Notice: Subject to any disclaimer, the term of this patent is extended or adjusted under 35 U.S.C. 154(b) by 0 days.

(21) Appl. No.: 18/908,058

(22) Filed: Oct. 7, 2024

Related U.S. Application Data

(60) Provisional application No. 63/684,897, filed on Aug. 20, 2024.

(51) Int. Cl.
*A63H 3/00* (2006.01)
*A61G 17/08* (2006.01)

(52) U.S. Cl.
CPC ............. *A63H 3/005* (2013.01); *A61G 17/08* (2013.01)

(58) Field of Classification Search
CPC ....... A61G 17/08; A63H 3/005; E04H 13/008
See application file for complete search history.

(56) References Cited

U.S. PATENT DOCUMENTS 6,023,822 A 2/2000 luebke
6,785,938 B1 * 9/2004 Johansen, Jr. ........ E04H 13/008 27/1
7,308,741 B1 * 12/2007 Rydberg ................ A61G 17/08 27/1
7,526,844 B2 * 5/2009 Pearce ................... A61G 17/08 27/1
7,627,935 B1 12/2009 Ostrum
D629,584 S 12/2010 Riehl
9,925,470 B1 3/2018 Palacio
10,245,203 B1 * 4/2019 Norris .................... A61G 17/08
D851,853 S 6/2019 Khan
10,688,006 B2 * 6/2020 Seltzer ................... A61G 17/08
10,780,007 B1 * 9/2020 Seitz .................... A61G 17/007
10,786,410 B2 * 9/2020 Venosi ................... A61G 17/08
10,905,616 B2 * 2/2021 Hatry ..................... A61G 17/08
12,083,055 B2 * 9/2024 Rawlings ............. A61G 17/007
2002/0100152 A1 * 8/2002 Ortega ................. A61G 17/007 27/1
2002/0168919 A1 * 11/2002 Perkins .................. A63H 3/005 446/369
2006/0059669 A1 * 3/2006 Rose .................... A61G 17/007 27/1
2006/0266079 A1 * 11/2006 Lavictoire ............ A44C 25/004 63/18
2009/0025194 A1 * 1/2009 Pearce ................... A61G 17/08 27/1
2013/0152348 A1 * 6/2013 Taylor .................. A61G 17/007 40/124.5

(Continued)

*Primary Examiner* — William L Miller
(74) *Attorney, Agent, or Firm* — Brennan, Manna & Diamond, LLC

(57) ABSTRACT

A pet memorial device is disclosed, which is a stuffed animal device for assisting people in grieving and coping with the loss of a pet. The pet memorial device comprises a body component that is configured in an animal shape. Further, the body component can be customized to resemble a pet or feature a unique design decorated with various accessories and keepsakes. Additionally, the body component may have a hollow interior cavity to retain the deceased pet's ashes. The ashes are typically stored in a weighted satchel and then sewn into the interior cavity of the body component to ensure they remain encapsulated. Thus, the device essentially serves as a replica and urn for a deceased pet, to bring a pet owner comfort during a tough time.

14 Claims, 4 Drawing Sheets

(56) References Cited

U.S. PATENT DOCUMENTS

| | | | | |
|---|---|---|---|---|
| 2019/0070056 | A1 | 3/2019 | Seltzer | |
| 2019/0160710 | A1* | 5/2019 | Allison | B28B 1/14 |
| 2020/0093673 | A1* | 3/2020 | Hatry | B44D 3/18 |
| 2022/0409464 | A1* | 12/2022 | Rawlings | A61G 17/007 |
| 2025/0222369 | A1* | 7/2025 | Freitas | A63H 9/00 |

* cited by examiner

PET MEMORIAL DEVICE

CROSS-REFERENCE TO RELATED APPLICATION

The present application claims priority to, and the benefit of, U.S. Provisional Application No. 63/684,897, which was filed on Aug. 20, 2024, and is incorporated herein by reference in its entirety.

FIELD OF THE INVENTION

The present invention relates generally to the field of pet memorial devices. More specifically, the present invention relates to a stuffed animal toy that helps pet owners grieve during the loss of a beloved pet. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in pet memorial devices. Generally, beloved pets will eventually pass away, and pet owners need to make the tough choice of burial or cremation. Further, pet owners may be distraught at the loss and be looking for different ways to memorialize their pet family members. Additionally, standard urns and other memorials may not be enough for people to cope with the loss of a pet.

Although it is common to cremate and store the ashes of family members, it has become increasingly popular to cremate recently departed pets and store their ashes in urns called pet urns. These pet urns take the form of boxes, vases, figurines, and statues made up of wood, stone, metal, or ceramic. Further, it is common to attach pictures to a pet urn or even sculpt a statue to resemble the face or body of the departed pet. While the process of using pet urns is common, the pet urns are limited to being characterized and utilized as stationery sculpted vessels that are delicate, untouchable, lifeless, and incapable of fully realizing the likeness or resemblance of your pet. A pet urn mirroring the likeness of a departed pet should have the look and feel of the pet. It should include fur and feel life-like. Thus, what is needed is a stuffed animal pet urn that closely resembles the likeness of a dearly departed pet.

Accordingly, there is a demand for an improved pet memorial device that assists people in grieving and coping with the loss of a pet. More particularly, there is a demand for a pet memorial device that is a customizable stuffed animal which stores the ashes of a deceased pet.

Therefore, there exists a long-felt need in the art for a pet memorial device that provides users with a stuffed animal toy that helps pet owners grieve during the loss of a beloved pet. There is also a long-felt need in the art for a pet memorial device that features a custom design with different personalized accessories that can resemble or memorialize a pet. Further, there is a long-felt need in the art for a pet memorial device that includes a weighted satchel filled with cremated remains that is sewn into the stuffed animal. Moreover, there is a long-felt need in the art for a device that allows users to carry around or display the stuffed animal in remembrance of a beloved deceased family pet. Further, there is a long-felt need in the art for a pet memorial device that serves as a replica and urn for a deceased pet. Finally, there is a long-felt need in the art for a pet memorial device that comforts a user during a tough time.

The subject matter disclosed and claimed herein, in one embodiment thereof, comprises a pet memorial device. The device is a stuffed animal device for assisting people in grieving and coping with the loss of a pet. The pet memorial device comprises a body component that is configured in an animal shape. Specifically, the body component is a stuffed animal that may vary in size, type, and design. Further, the body component can be customized to resemble a pet or feature a unique design decorated with various accessories and keepsakes. Additionally, the body component may have a hollow interior cavity to retain the deceased pet's ashes. The ashes are typically stored in a weighted satchel and then sewn into the interior cavity of the body component to ensure they remain encapsulated. Thus, the device essentially serves as a replica and urn for a deceased pet, to bring a pet owner comfort during a tough time.

In this manner, the pet memorial device of the present invention accomplishes all of the foregoing objectives and provides users with a stuffed animal that retains a deceased pet's ashes. The device is a stuffed animal that can be customized to resemble a pet. The device can comprise various accessories.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a pet memorial device. The device is a stuffed animal device for assisting people with the loss of a pet. The pet memorial device comprises a body component that is configured in an animal shape with a hollow interior cavity for retaining a deceased pet's ashes. Further, the body component can be customized to resemble a pet or feature a unique design decorated with various accessories and keepsakes. Thus, the device essentially serves as a replica and urn for a deceased pet, to bring a pet owner comfort.

In one embodiment, the pet memorial device helps pet owners grieve during the loss of a beloved pet. The device can be customized, if desired to resemble or memorialize a pet. Thus, distraught pet owners may memorialize their pet family members via the device. Further, traditional urns may be cold and un-customizable, and thus inadequate for pet owners to cope with the loss of a pet. Whereas, the pet memorial device can be made to resemble the beloved pet and allows users to carry around or display the stuffed animal in remembrance of the beloved deceased family pet.

In one embodiment, the pet memorial device is a unique, customizable pet urn. Specifically, the pet memorial device comprises a body component that is a stuffed animal urn for assisting people in grieving and coping with the loss of a pet. The body component is a stuffed animal that may vary in size, type, and design. Typically, the body component is configured in an animal shape, such as a dog, cat, hamster, horse, pony, sheep, lamb, snake, bird, turtle, lizard, etc., or any other suitable animal and/or pet as is known in the art.

In one embodiment, the body component is covered in fur and stuffed in accordance with the present disclosure. In another embodiment, the body component is covered in a smooth or coarse material and filled with pellets, beads, beans, etc., or other suitable fill as is known in the art. Typically, the body component can be manufactured of any suitable material as is known in the art, depending on the pet and/or animal it is meant to represent. Further, the body component can then be filled with any suitable filling as is known in the art, such as stuffing, cotton, pellets, beads, beans, sand, etc.

In one embodiment, the body component resembles a dog. In this embodiment, the body component includes a head with ears, a mouth, and eyes, as well as legs and a tail.

In one embodiment, the body component has a hollow interior cavity to retain the deceased pet's ashes. The ashes are typically stored in a weighted satchel and then sewn into the interior cavity of the body component to ensure they remain encapsulated. Further, the stuffing material is filled around the hollow interior cavity of the pet body component.

In one embodiment, the body component comprises a hollow interior cavity. The hollow interior cavity can be positioned in any position on the body component but is typically positioned at a bottom of the body component. However, the hollow interior cavity can be located in the center of the stuffed animal underbelly or may be located anywhere on the body component. The hollow interior cavity can be any suitable size and shape as is known in the art, as long as the hollow interior cavity is sized and shaped to retain a deceased pet's ashes or remains of the cremated pet body.

In one embodiment, the deceased pet's ashes are stored in a weighted satchel or other suitable securing means as is known in the art, which can then be sewn into the body component. The weighted satchel can be any suitable shape and size as is known in the art, depending on the amount or volume of ashes needing to be stored.

In one embodiment, the hollow interior cavity may include a door or open slot that is configured to open and close in order to receive and secure the ashes of the cremated pet body. In another embodiment, the hollow interior cavity is sewn shut to retain the cremated pet body. Thus, the ashes are stored in a weighted satchel and then sewn into the body component to ensure they remain encapsulated and secure.

In one embodiment, the body component can be customized to resemble a pet or feature a unique design decorated with various accessories and keepsakes. Specifically, the body component can be decorated with the deceased pet's collar, ID tags, bows, clothes, etc., or any other suitable accessories as is known in the art.

In one embodiment, the body component is designed to replicate the appearance of a deceased pet and is produced based on a 3D model. Specifically, a plurality of photographs of the deceased pet can be utilized with 3D modeling software, such as PROENGINEER®, SOLIDWORKS®, AUTOCAD®, TEKLA®, or TINKERCAD® to create the body component replica of the deceased pet. Upon designing the 3D model using the 3D modeling software, the user may add details to the model according to the captured photographic images, such as placement of the head, eyes, ears, arms, legs, and tail, etc. The 3D modeling software may also acquire measurement information of the pet body from the plurality of photographic viewpoints of the pet body. The measurement information may include metrics pertaining to inches, centimeters, or millimeters which determine the placement of certain anatomical structures (i.e., eyes, ears, arms, legs, and tail) should be located on the stuffed animal pet urn body component. Further, the 3D modeling software may print the model out on a 3D printing device such as FORMLABS®, ULTIMAKER 3®, ROBO 3D R1®, or MAKERBOT REPLICATOR®. Thus, the device essentially serves as a replica and urn for a deceased pet, to bring a pet owner comfort during a tough time.

In one embodiment, the pet memorial device is manufactured from plush, knitted, or woven fabrics like fleece, velour, velveteen, cotton, or polyester, or other suitable materials as is known in the art, or a combination of such materials.

In yet another embodiment, the pet memorial device comprises a plurality of indicia.

In yet another embodiment, a method of storing a deceased pet's ashes in a customizable urn is disclosed. The method includes the steps of providing a pet memorial device comprising a body component which is a stuffed animal. The method also comprises cremating a deceased pet. Further, the method comprises filling a weighted satchel with the deceased pet's ashes. The method also comprises sewing the weighted satchel within the body component. Finally, the method comprises customizing the body component with various accessories and keepsakes.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
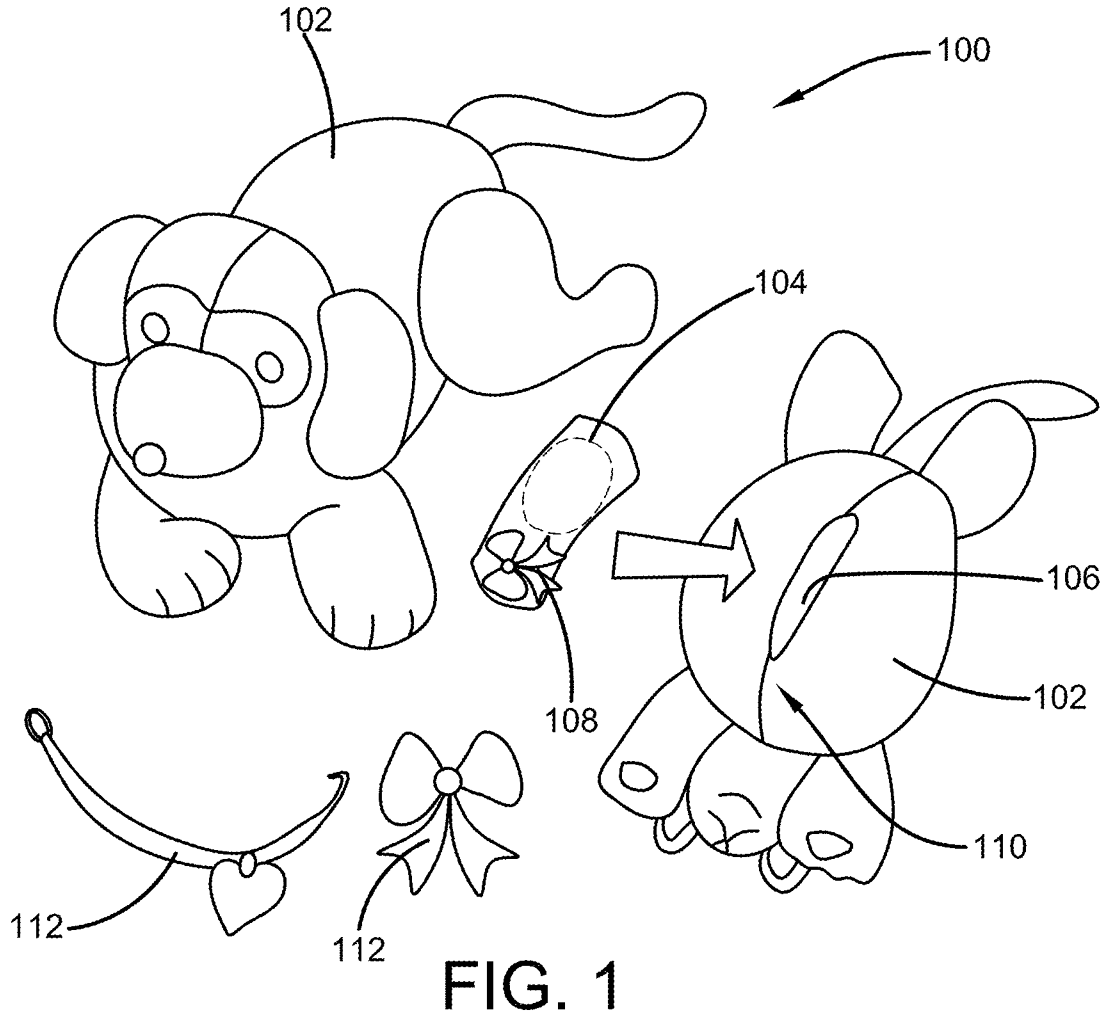
FIG. 1 illustrates a perspective view of one embodiment of the pet memorial device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a pet memorial device that provides users with a stuffed animal toy that helps pet owners grieve during the loss of a beloved pet. There is also a long-felt need in the art for a pet memorial device that features a custom design with different personalized accessories that can resemble or memorialize a pet. Further, there is a long-felt need in the art for a pet memorial device that includes a weighted satchel filled with cremated remains that is sewn into the stuffed animal. Moreover, there is a long-felt need in the art for a device that allows users to carry around or display the stuffed animal in remembrance of a beloved deceased family pet. Further, there is a long-felt need in the art for a pet memorial device that serves as a replica and urn for a deceased pet. Finally, there is a long-felt need in the art for a pet memorial device that comforts a user during a tough time.

The present invention, in one exemplary embodiment, is a novel pet memorial device. The pet memorial device comprises a body component that is configured in an animal shape. Further, the body component can be customized to resemble a pet or feature a unique design decorated with various accessories and keepsakes. Additionally, the body component may have a hollow interior cavity to retain the deceased pet's ashes. The ashes are typically stored in a weighted satchel and then sewn into the interior cavity of the body component to ensure they remain encapsulated. The present invention also includes a novel method of storing a deceased pet's ashes in a customizable urn. The method includes the steps of providing a pet memorial device comprising a body component which is a stuffed animal. The method also comprises cremating a deceased pet. Further, the method comprises filling a weighted satchel with the deceased pet's ashes. The method also comprises sewing the weighted satchel within the body component. Finally, the method comprises customizing the body component with various accessories and keepsakes.

Referring initially to the drawings, FIG. 1 illustrates a perspective view of one embodiment of the pet memorial device 100 of the present invention. In the present embodiment, the pet memorial device 100 is an improved pet memorial device 100 that helps a user grieve during the loss of a beloved pet. Specifically, the pet memorial device 100 comprises a body component 102 filled with a deceased pet's ashes 104. Thus, the device 100 essentially serves as a replica and urn for a deceased pet, to bring a pet owner comfort.

Generally, the pet memorial device 100 helps pet owners grieve during the loss of a beloved pet. The device 100 can be customized, if desired to resemble or memorialize a pet. Thus, distraught pet owners may memorialize their pet family members via the device 100. Further, traditional urns may be cold and un-customizable, and thus inadequate for pet owners to cope with the loss of a pet. Whereas, the pet memorial device 100 can be made to resemble the beloved pet and allows users to carry around or display the stuffed animal in remembrance of the beloved deceased family pet.

Further, the pet memorial device 100 is a unique, customizable pet urn. Specifically, the pet memorial device 100 comprises a body component 102 that is a stuffed animal urn for assisting people in grieving and coping with the loss of a pet. The body component 102 is a stuffed animal that may vary in size, type, and design. Typically, the body component 102 is configured in an animal shape, such as a dog, cat, hamster, horse, pony, sheep, lamb, snake, bird, turtle, lizard, etc., or any other suitable animal and/or pet as is known in the art.

Figure 2:
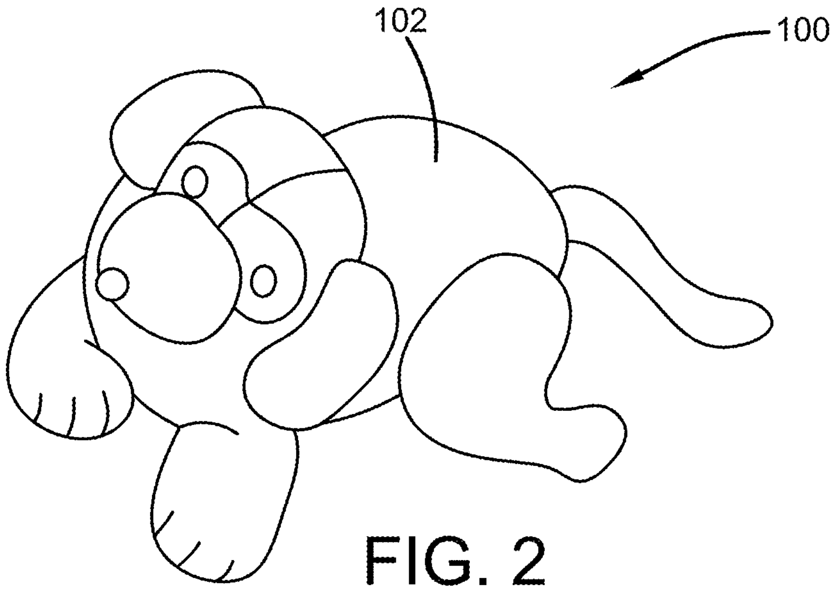
FIG. 2 illustrates a perspective view of one embodiment of the pet memorial device of the present invention showing the body component in accordance with the disclosed architecture.

As shown in FIG. 2, the body component 102 is covered in fur and stuffed in accordance with the present disclosure. In another embodiment, the body component 102 is covered in a smooth or coarse material and filled with pellets, beads, beans, etc., or other suitable fill as is known in the art. Typically, the body component 102 can be manufactured of any suitable material as is known in the art, depending on the pet and/or animal it is meant to represent. Further, the body component 102 can then be filled with any suitable filling as is known in the art, such as stuffing, cotton, pellets, beads, beans, sand, etc.

In one embodiment, the body component 102 resembles a dog. In this embodiment, the body component 102 includes a head with ears, a mouth, and eyes, as well as legs and a tail.

Figure 3:
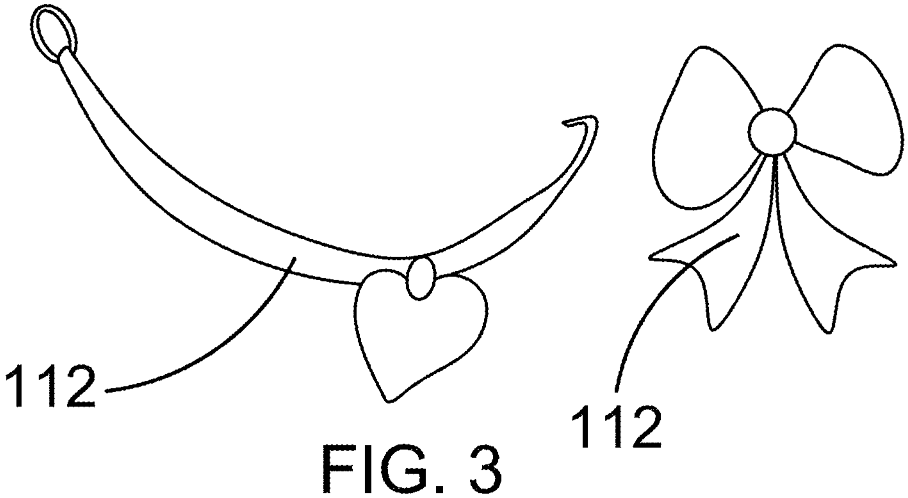
FIG. 3 illustrates a perspective view of one embodiment of the pet memorial device of the present invention showing the weighted satchel being positioned within the body component in accordance with the disclosed architecture.

As shown in FIG. 3, the body component 102 has a hollow interior cavity 106 to retain the deceased pet's ashes 104. The ashes 104 are typically stored in a weighted satchel 108 and then sewn into the interior cavity 106 of the body component 102 to ensure they remain encapsulated. Further, the stuffing material is filled around the hollow interior cavity 106 of the pet body component 102.

Further, the body component 102 comprises a hollow interior cavity 106. The hollow interior cavity 106 can be positioned in any position on the body component 102 but is typically positioned at a bottom 110 of the body component 102. However, the hollow interior cavity 106 can be located in the center of the stuffed animal underbelly (i.e., bottom 110) or may be located anywhere on the body component 102. The hollow interior cavity 106 can be any suitable size and shape as is known in the art, as long as the hollow interior cavity 106 is sized and shaped to retain a deceased pet's ashes 104 or remains of the cremated pet body.

Additionally, the deceased pet's ashes 104 are stored in a weighted satchel 108 or other suitable securing means as is known in the art, which can then be sewn into the body component 102. The weighted satchel 108 can be any suitable shape and size as is known in the art, depending on the amount or volume of ashes 104 needing to be stored.

In one embodiment, the hollow interior cavity 106 may include a door (not shown) or open slot that is configured to open and close in order to received and secure the ashes 104 of the cremated pet body. In another embodiment, the hollow interior cavity 106 is sewn shut to retain the cremated pet body. Thus, the ashes 104 are stored in a weighted satchel 108 and then sewn into the body component 102 to ensure they remain encapsulated and secure.

Figure 4:
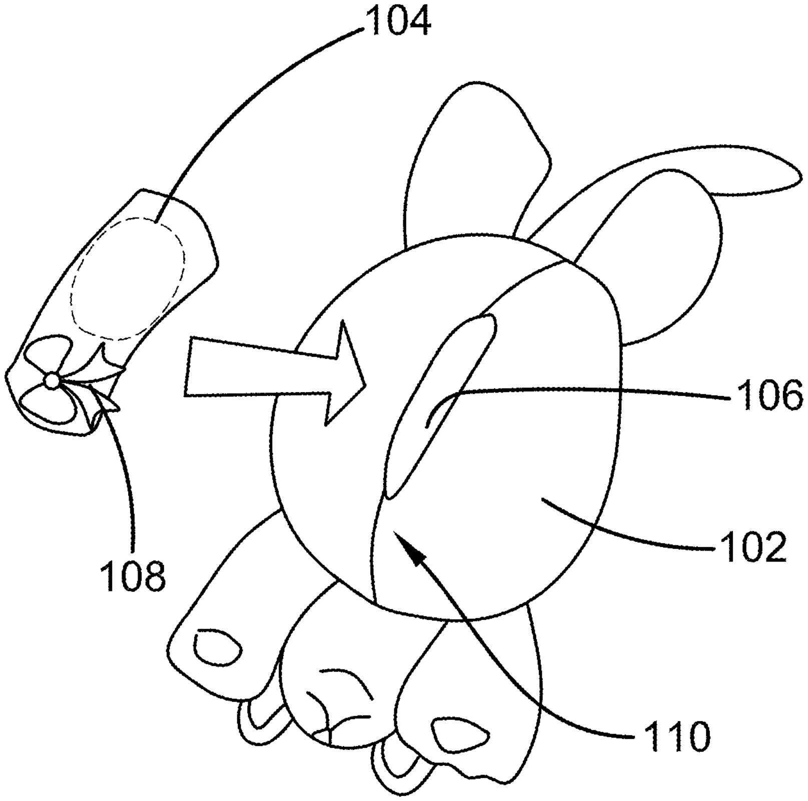
FIG. 4 illustrates a perspective view of one embodiment of the pet memorial device of the present invention showing the various accessories in accordance with the disclosed architecture.

As shown in FIG. 4, the body component 102 can be customized to resemble a pet or feature a unique design decorated with various accessories 112 and keepsakes. Specifically, the body component 102 can be decorated with the deceased pet's collar, ID tags, bows, clothes, etc., or any other suitable accessories 112 as is known in the art.

Figure 5:
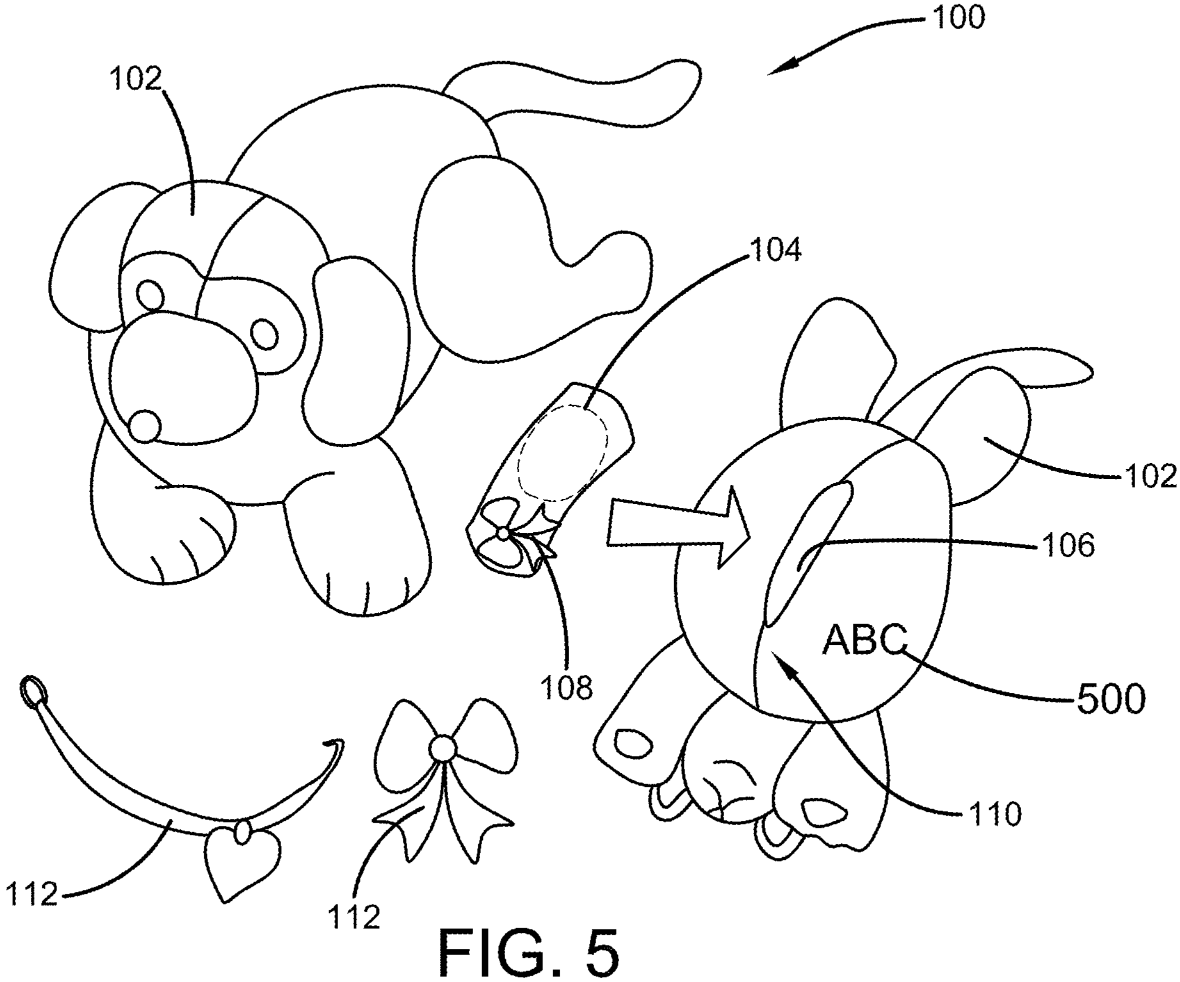
FIG. 5 illustrates a perspective view of one embodiment of the pet memorial device of the present invention showing the device in use in accordance with the disclosed architecture.

As shown in FIG. 5, the pet memorial device 100 is manufactured from plush, knitted, or woven fabrics like fleece, velour, velveteen, cotton, or polyester, or other suitable materials as is known in the art, or a combination of such materials.

In one embodiment, the pet memorial device 100 comprises a plurality of indicia 500. The body component 102 of the device 100 may include advertising, a trademark, or other letters, designs, or characters, printed, painted, stamped, or integrated into the body component 102, or any other indicia 500 as is known in the art. Specifically, any suitable indicia 500 as is known in the art can be included, such as, but not limited to, patterns, logos, emblems, images, symbols, designs, letters, words, characters, animals, advertisements, brands, etc., that may or may not be pet, ashes, or brand related.

In yet another embodiment, the body component 102 is designed to replicate the appearance of a deceased pet and is produced based on a 3D model. Specifically, a plurality of photographs of the deceased pet can be utilized with 3D modeling software, such as PROENGINEER®, SOLIDWORKS®, AUTOCAD®, TEKLA®, or TINKERCAD® to create the body component 102 replica of the deceased pet. Upon designing the 3D model using the 3D modeling software, the user may add details to the model according to the captured photographic images, such as placement of the head, eyes, ears, arms, legs, and tail, etc. The 3D modeling software may also acquire measurement information of the pet body from the plurality of photographic viewpoints of the pet body. The measurement information may include metrics pertaining to inches, centimeters, or millimeters which determine the placement of certain anatomical structures (i.e., eyes, ears, arms, legs, and tail) should be located on the stuffed animal pet urn body component 102. Further, the 3D modeling software may print the model out on a 3D printing device such as FORMLABS®, ULTIMAKER 3®, ROBO 3D R1®, or MAKERBOT REPLICATOR®. Thus, the device 100 essentially serves as a replica and urn for a deceased pet, to bring a pet owner comfort during a tough time.

Figure 6:
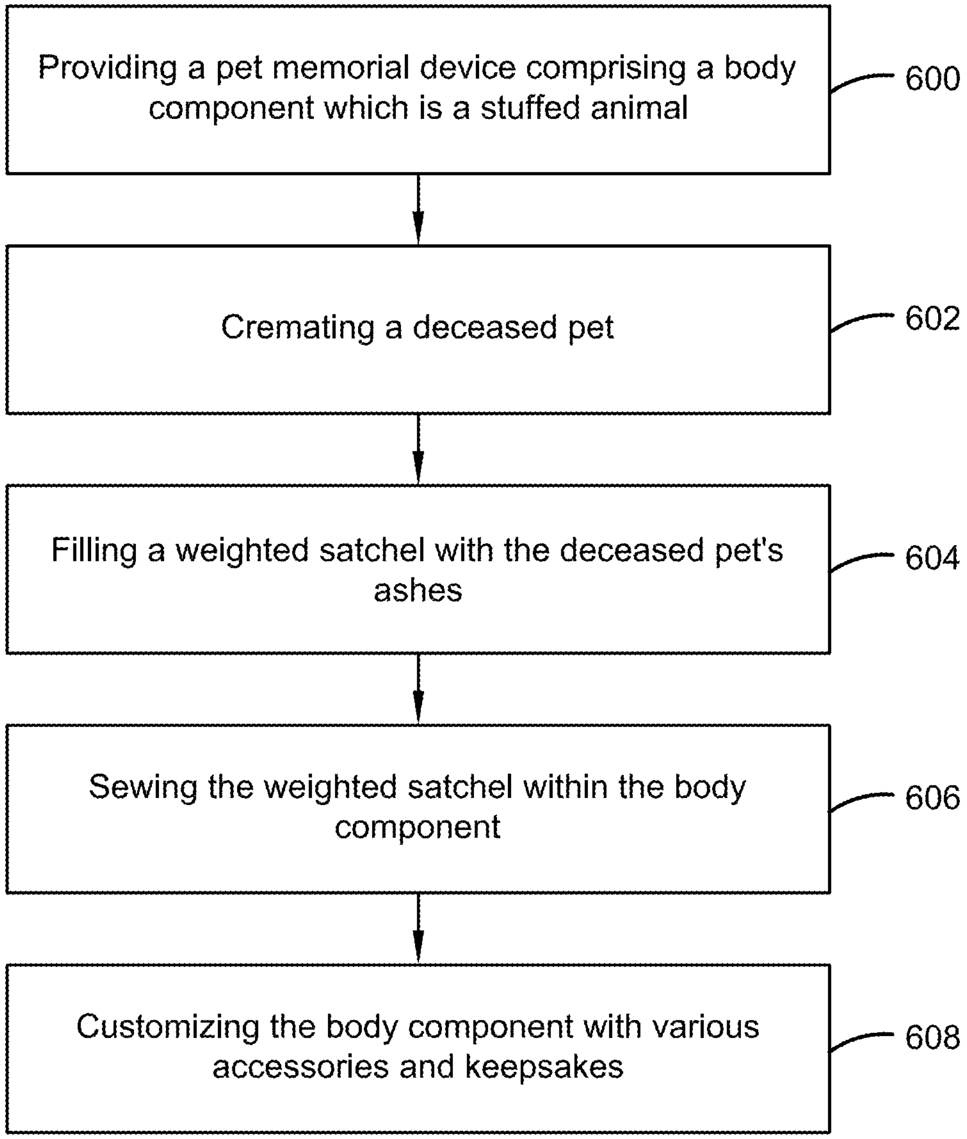
FIG. 6 illustrates a flowchart showing the method of storing a deceased pet's ashes in a customizable urn in accordance with the disclosed architecture.

FIG. 6 illustrates a flowchart of the method of storing a deceased pet's ashes in a customizable urn. The method includes the steps of at 600, providing a pet memorial device comprising a body component which is a stuffed animal. The method also comprises at 602, cremating a deceased pet. Further, the method comprises at 604, filling a weighted satchel with the deceased pet's ashes. The method also comprises at 606, sewing the weighted satchel within the body component. Finally, the method comprises at 608, customizing the body component with various accessories and keepsakes.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "pet memorial device", "pet device", "memorial device", and "device" are interchangeable and refer to the pet memorial device 100 of the present invention.

Notwithstanding the foregoing, the pet memorial device 100 of the present invention can be of any suitable size and configuration as is known in the art without affecting the overall concept of the invention, provided that it accomplishes the above-stated objectives. One of ordinary skill in the art will appreciate that the pet memorial device 100 as shown in FIGS. 1-6 is for illustrative purposes only, and that many other sizes and shapes of the pet memorial device 100 are well within the scope of the present disclosure. Although the dimensions of the pet memorial device 100 are important design parameters for user convenience, the pet memorial device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A pet memorial device for helping a user grieve during the loss of a beloved pet, the pet memorial device comprising:

a body component;

wherein the body component is filled with a deceased pet's ashes;

wherein the body component is a stuffed animal;

wherein the body component is configured in an animal shape of one of the following: a dog, a cat, a hamster, a horse, a pony, a sheep, a lamb, a snake, a bird, a turtle and a lizard;

wherein the body component has a hollow interior cavity to retain the deceased pet's ashes;

wherein the deceased pet's ashes are stored in a weighted satchel;

wherein the weighted satchel is sewn into the hollow interior cavity of the body component to ensure the deceased pet's ashes remain encapsulated; and further wherein the body component serves as a replica and an urn for the deceased pet to bring a pet owner comfort.

2. The pet memorial device of claim 1, wherein the body component is covered in fur and filled with stuffing.

3. The pet memorial device of claim 1, wherein the body component is covered in a smooth or coarse material and filled with a plurality of pellets, beads or beans, a cotton, or a sand.

4. The pet memorial device of claim 1, wherein stuffing material is filled around the hollow interior cavity of the body component.

5. The pet memorial device of claim 4, wherein the hollow interior cavity is positioned on the body component, at an underbelly of the animal.

6. The pet memorial device of claim 5, wherein the hollow interior cavity includes a door that is configured to open and close in order to receive and secure the deceased pet's ashes.

7. The pet memorial device of claim 6, wherein the body component is customized to resemble the deceased pet with accessories and/or keepsakes.

8. A pet memorial device for helping a user grieve during the loss of a beloved pet, the pet memorial device comprising:

a body component configured in a stuffed animal shape of one of the following: a dog, a cat, a hamster, a horse, a pony, a sheep, a lamb, a snake, a bird, a turtle and a lizard; and wherein the body component has a hollow interior cavity to retain a deceased pet's ashes;

wherein the deceased pet's ashes are stored in a weighted satchel;

wherein the weighted satchel is sewn into the hollow interior cavity of the body component to ensure the deceased pet's ashes remain encapsulated;

wherein stuffing material is filled around the hollow interior cavity of the body component;

wherein the hollow interior cavity is positioned on the body component, at an underbelly of the stuffed animal shape;

wherein the body component is customized to resemble the deceased pet with accessories and/or keepsakes; and further wherein the body component serves as a replica and an urn for the deceased pet to bring a pet owner comfort.

9. The pet memorial device of claim 8, wherein the accessories and/or keepsakes include a collar, an ID tag, a bow, or a clothing item.

10. The pet memorial device of claim 8, wherein the body component is manufactured from a plush, a knitted or a woven fabric.

11. The pet memorial device of claim 8 further comprising a plurality of indicia.

12. The pet memorial device of claim 8, wherein the body component is produced based on a 3D model.

13. The pet memorial device of claim 8, wherein the stuffed animal shape is of the dog, and includes a head with ears, a mouth, eyes, legs and a tail.

14. A method of storing a deceased pet's ashes in a customizable urn, the method comprising the following steps:

providing a pet memorial device defining the urn and comprising a body component which is a stuffed animal;

cremating a deceased pet;

filling a weighted satchel with the deceased pet's ashes;

sewing the weighted satchel within the body component to ensure the deceased pet's ashes remain encapsulated; and customizing the body component with accessories and/or keepsakes.

* * * * *